United States Patent
Kuriyama

[11] Patent Number: 5,842,949
[45] Date of Patent: Dec. 1, 1998

[54] AUTOMATIC TRANSMISSION CONTROL SYSTEM

[75] Inventor: Minoru Kuriyama, Higashihiroshima, Japan

[73] Assignee: Mazda Motor Corporation, Higashihiroshima, Japan

[21] Appl. No.: 625,518

[22] Filed: Mar. 26, 1996

[30] Foreign Application Priority Data

Mar. 27, 1995 [JP] Japan ................................. 7-067313

[51] Int. Cl.[6] .................................................. F16H 61/14
[52] U.S. Cl. .............................. 477/63; 477/65; 477/132; 477/169
[58] Field of Search .................................. 477/63, 64, 65, 477/70, 74, 77, 83, 81, 132, 169, 134

[56] References Cited

U.S. PATENT DOCUMENTS

| | | | |
|---|---|---|---|
| 4,457,410 | 7/1984 | Suga et al. ................................. | 477/63 |
| 4,526,557 | 7/1985 | Tanaka et al. ........................ | 477/63 X |
| 4,539,869 | 9/1985 | Suga et al. ................................. | 477/63 |
| 4,687,083 | 8/1987 | Sotoyama et al. ...................... | 477/169 |
| 5,074,371 | 12/1991 | Shibayama .......................... | 477/108 X |
| 5,085,301 | 2/1992 | Imamura et al. ....................... | 477/169 |
| 5,086,894 | 2/1992 | Iizuka et al. .......................... | 477/180 X |
| 5,213,186 | 5/1993 | Murata .................................... | 477/169 |
| 5,468,196 | 11/1995 | Minowa et al. ......................... | 477/62 |
| 5,496,233 | 3/1996 | Ishiguro ................................ | 477/64 X |
| 5,505,670 | 4/1996 | Inuzuka et al. ........................... | 477/65 |
| 5,522,778 | 6/1996 | Iwase et al. .......................... | 477/65 X |
| 5,547,438 | 8/1996 | Nozaki et al. ........................... | 477/169 |

FOREIGN PATENT DOCUMENTS 5203047  8/1993  Japan .

Primary Examiner—Dirk Wright
Assistant Examiner—Peter T. Kwon
Attorney, Agent, or Firm—Sixbey, Friedman, Leedom & Ferguson; Gerald J. Ferguson, Jr.; Donald R. Studebaker

[57] ABSTRACT

A control system for controlling an automatic transmission equipped with a torque converter which is locked and unlocked through a lockup clutch has a lockup release control device which releases locking of the torque converter at different release rates between a downshift resulting from an increase in engine load and a downshift resulting not from an increase in engine load.

24 Claims, 9 Drawing Sheets

FIG. 4

| SHIFT LEVER POSITION | | CLUTCH | | | | BRAKE | | ONE-WAY CLUTCH | |
|---|---|---|---|---|---|---|---|---|---|
| | | REV (24) | FED (20) | CST (21) | 3-4 (27) | LRV (25) | 2-4 (23) | OWC (26) | OWC (22) |
| PARK(P) | | O | | | | | | | |
| REVERSE(R) | | | | | | O | | | |
| NEUTRAL(N) | | | | | | | | | |
| DRIVE(D) | 1ST GEAR | | O | | | | | | (O) |
| | 2ND GEAR | | O | | | | O | | (O) |
| | 3RD GEAR | | O | O | O | | | (O) | (O) |
| | 4TH GEAR | | O | O | O | | O | | |
| SECOND SPEED (2) | 1ST GEAR | | O | | | | | | (O) |
| | 2ND GEAR | | O | O | | | O | (O) | (O) |
| | 3RD GEAR | | O | O | O | | | | (O) |
| FIRST SPEED (1) | 1ST GEAR | | O | O | | | | | (O) |
| | 2ND GEAR | | O | O | | | O | | (O) |

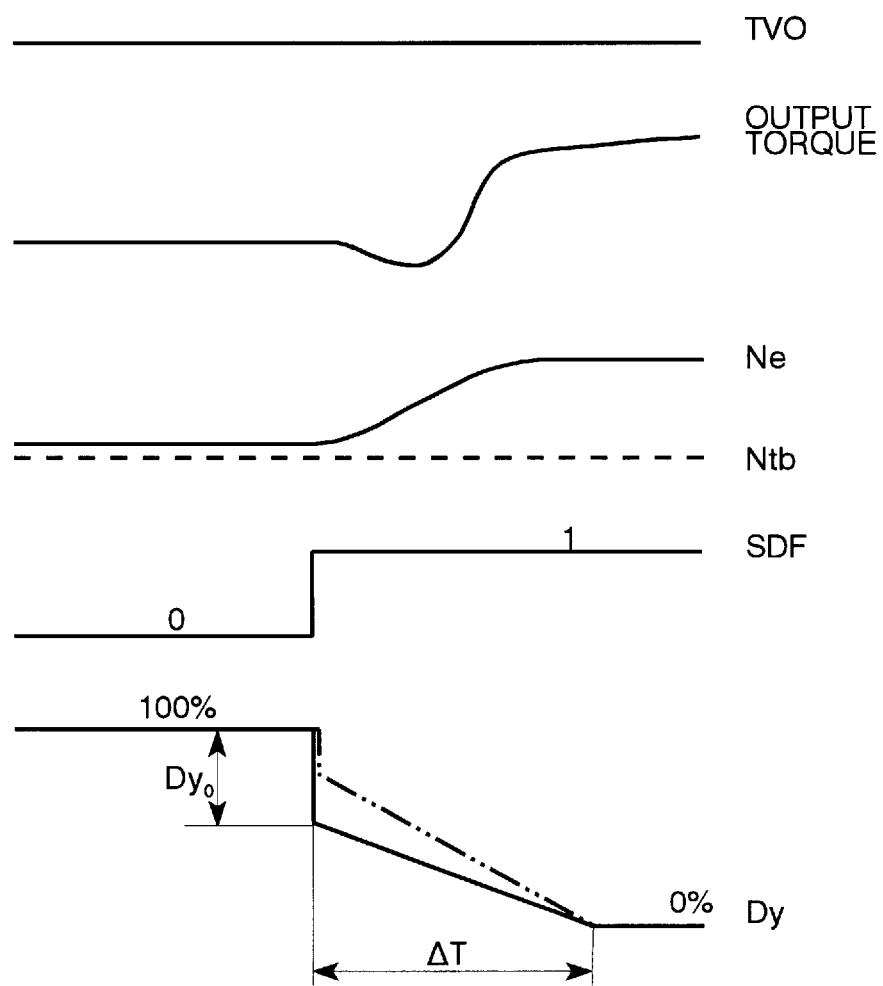

AUTOMATIC TRANSMISSION CONTROL SYSTEM

BACKGROUND OF THE INVENTION

1. Field of Application

This invention relates to a control system for an automatic transmission equipped to an automotive vehicle.

2. Description of Related Art

A torque converter of an automatic transmission equipped to an automotive vehicle transmits available engine torque through the fluid coupling, but incurs energy loss resulting from the resistance of hydraulic fluid. A lockup mechanism has been recently employed to prevent this type of energy loss by means of a clutch which mechanically and directly couples input and output shafts of the torque converter together when the rotational speed of the input shaft is at approximately the same rotational speed as of the output shaft. This results in the transmission being driven without the effect of torque conversion. The automatic transmission of the type equipped with a lockup mechanism must be able to turn the lockup mechanism on and off in response to driving conditions. For example, as set forth in, for instance, Japanese Unexamined Patent Publication No.5-203047, when a downshift is necessitated, the lockup function is released at approximately the time when the downshift is executed.

As further set forth in the Japanese Unexamined Patent Publication No.5-203047, it is desirable that the lockup release action, at the time of a downshift, be executed at the highest possible speed in order to avoid a shift shock which can occur if the input and output shafts of torque converter are momentarily coupled together during the executed of the downshift while the transmission mechanism has completed the downshift.

If, however, the lockup clutch is instantaneously released, a sudden release of the mechanical coupling, in other words, a sudden creation of the fluid coupling, between the converter input and output shafts results in a significant energy loss. If a downshift is executed while the engine is under a sharp increase in load, there is little fall off in overall torque, even though an energy loss due to the torque converter occurs, owing to an increase in output torque from the engine and a shift shock the driver experiences does not occurs. If, however, a downshift occurs at a slow vehicle speed, or as a result of manual operation of the shift lever, an energy loss due to the torque converter occurs with no compensating torque output from the engine, and as a result, torque output is suddenly and momentarily lowered, which leads to a significant shock.

SUMMARY OF THE INVENTION

It is an object of the invention to provide an automatic transmission control system in which shift shocks incurred upon an occurrence of torque converter unlocking during a downshift can be reduced, regardless of causes of inducement of the downshift.

The foregoing object of the invention is accomplished by providing a control system for an automatic transmission of the type incorporating a lockup means to mechanically interconnect input and output shafts of a torque converter installed therein, and a lockup release means to release the lockup condition of the lockup means when a downshift is executed. The automatic transmission control system of the invention comprises a lockup release control means for determining whether or not a downshift results from an increase in engine load and for, in cases where the downshift is caused not from an increase in engine load, causing the lockup release means to release the lockup condition of the torque converter at a rate reduced as compared to the rate for downshifts caused due to increases in engine load.

The lockup release control means may be constructed such that it monitors and compares an increasing rate of throttle opening to a specific reference value and determining when that rate is greater than the reference value that a downshift is caused due to an increase in engine load. The lockup release control means may incorporate with means for detecting manual shift operations executed by the driver and, when a manual downshift is detected, determining the downshift to be due not to engine load. In this instance, it is preferable that the manual shift detection means may comprise a switch to detect selected positions of the shift lever, or a manual switch which is operated to cause specific gear shifts.

The lockup release control means is desirably structured such that, it determines that a downshift is caused due to an increase in engine load, it maintain clutch lockup pressure at a level greater during releasing the lockup condition as engine load becomes higher.

According to an aspect of the invention, the lockup release during a downshift is relatively quickly executed if it is determined that the downshift is caused due to an increase in engine load and, consequently, prevents an occurrence of a state where, while the downshift is completed, the torque converter has not been released or unlocked (that is, the torque converter is in a condition that its input and output shafts are mechanically coupled together) or a time for which the uncoupled state is appearing, preventing significant shift shocks from being generated. When the lockup release is executed relatively quickly, while there is a momentary energy loss at the torque converter, an increase in engine output torque makes the energy loss be as small as possible, resulting in an ensuing reduction in shift shock transmitted to the driver.

In cases where a downshift occurs due not to an increase in engine load, in other words, it is determined that a downshift is to be executed without being accompanied by a significant increase in engine output, the lockup release is executed at a relatively slow rate, thus preventing a sudden falloff in output torque resulting from a sudden occurrence of energy loss at the torque converter and generally ensuing shift shocks following the sudden falloff in output torque.

A downshift is determined to be taking place resulting from an increase in engine load when an increase in throttle opening occurs at a rate beyond a specified rate, that is, when the downshift follows a sudden opening of the throttle valve. Further, a downshift is determined to be taking place resulting not from an increase in engine load when manual downshift operations, monitored for instance through a shift position switch and/or a manual switch for causing specific gear shifts, are detected. When a downshift is determined to be from an increase in engine load, that is, when the lockup release takes place at a relatively low rate, if, regardless of a high level of engine torque, lowering lockup pressure instantaneously and significantly results in the problem that the lockup mechanism may completely release even if the lockup pressure has not yet reached zero (0). Conversely, the lockup release can occur late if there is a low rate of lockup pressure decrease, even with engine torque at a low level. However, if the lockup pressure is held at a level raised during lockup releasing as engine torque is greater, the lockup release proceeds at an approximately constant rate regardless of engine torque.

BRIEF DESCRIPTION OF THE DRAWINGS

The above and other objects and features of the invention will be clearly understood from the following description with respect to an embodiment thereof when considered in conjunction with the accompanying drawings, in which:

FIG. 4 is a table showing operations of various friction coupling elements in various selected gears;

FIG. 8 is a time chart showing the lockup release control when a downshift takes place due not to an abrupt increase in throttle opening;

DETAILED DESCRIPTION OF THE INVENTION

Figure 2:
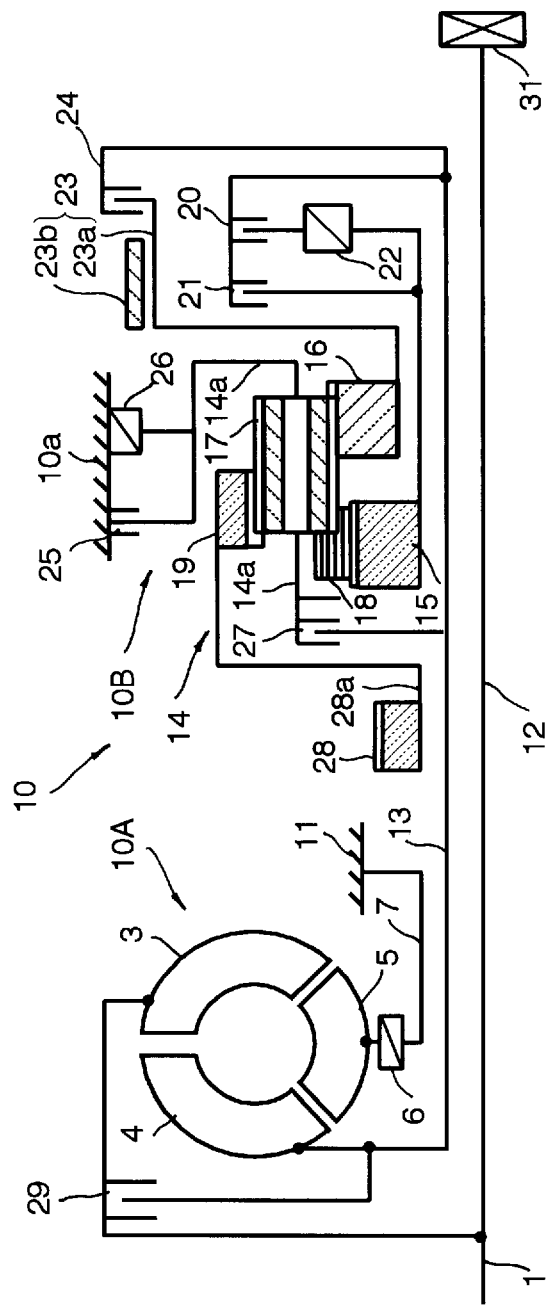
FIG. 2 is a skeleton diagram showing an automatic transmission equipped with a torque converter which is controlled by a control system of the invention.

Referring to the drawings in detail, in particular to FIG. 2 showing an automatic transmission incorporating a control system in accordance with an embodiment of the invention. The automatic transmission is comprised of a torque converter 10A, a transmission mechanism 10B, such as a multiple speed transmission mechanism, connected to an output shaft of the torque converter 10A, and a hydraulic control circuit 10C shown in FIG. 3. Transmission mechanism 10B utilizes a plurality of friction coupling elements, such as clutches and brakes, which are selectively coupled to change the power transmission path, so as thereby to provide any desired gear. The hydraulic control circuit 10C performs control to couple or lock and release or unlock each of the friction coupling elements.

As further shown in FIG. 2, the torque converter 10A is comprised of a pump 3, a turbine 4 and a stator 5. The pump 3 is fixedly installed to the interior of a casing connected to an engine output shaft 1. The turbine 4 is installed facing the pump 3 and is driven by the force of the oil discharged from the pump 3. The stator 5 is positioned between the pump 3 and turbine 4 and is fixedly supported on a stationary shaft 7 by means of a one-way clutch 6 so as to turn only in a single direction.

Transmission mechanism 10B is comprised of a center shaft 12 whose forward end (the left end as viewed in FIG. 2) is connected to the engine output shaft 1, and whose rearward end (the right end as viewed in FIG. 2) is connected to an oil pump 31. A hollow cylindrical turbine shaft 13 is installed around the center shaft 12 with its forward end fixedly connected to the turbine 4 of torque converter 10A. In the transmission mechanism 10, there is installed around the turbine shaft 13 a planetary gear set 14 which is comprised of a small sun gear 15, a large diameter of sun gear 16, a long pinion gear 17, a short pinion gear 18, a ring gear 19, and various friction coupling elements.

At one end of the transmission mechanism remote from the engine, a forward clutch (FWDC) 20 and a coast clutch (CSTC) 21 are installed in parallel with each other between the turbine shaft 13 and small sun gear 15. The forward clutch 20 connects and disconnects power transmission from the turbine shaft 13 to the small sun gear 15 through a one-way clutch 22. Similarly, the coast clutch 21 connects and disconnects the power transmission between the turbine shaft 13 and small sun gear 15. A 2–4 shift brake (2–4B) 23, which is installed on the radial periphery of the coast clutch 21, includes a brake drum 23a to which the large sun gear 16 is attached and a brake band 23b which can be applied against the brake drum 23a. The large sun gear 16 is locked as a result of coupling the 2–4 brake 23. A reverse clutch (REVC) 24, which is installed adjacent to the 2–4 shift brake 23, connects and disconnects power transmission between the large sun gear 16 and turbine shaft 13 through the brake drum 23a. Radially outside of the planetary gear set 14, there are a low-reverse brake (LRVB) 25 and a one-way clutch 26 installed in parallel with each other between a carrier 14a of the planetary gear set 14 and a casing 10a of the transmission mechanism 10B. The low-reverse brake 25 places the carrier 14a in engagement with and disengagement from the transmission casing 10a. The 3–4 shift clutch (3–4C) 27 is installed on a side of planetary gear set 14 close to the engine, which connects and disconnects power transmission between the carrier 14a and turbine shaft 13. On one side of the 3–4 shift clutch 27 close to the torque converter, there is an output gear 28 connected to the ring gear 19 through the output shaft 28a.

The engine output shaft 1 and turbine shaft 13 is mechanically coupled together directly to each other, in case of needed, not through fluid coupling but by means of lockup clutch 29.

Transmission mechanism 10B itself provides four forward gears and one reverse gear by selectively locking and unlocking the friction coupling elements including at least the clutches 20, 21, 24 and 27 and brakes 23 and 25. The relationship between the selected gears and operation of the clutches and brakes is shown in FIG. 4 in which a friction coupling element is locked in a gear indicated by a circle in parentheses and, however, does not contributory to the gear.

Figure 3:
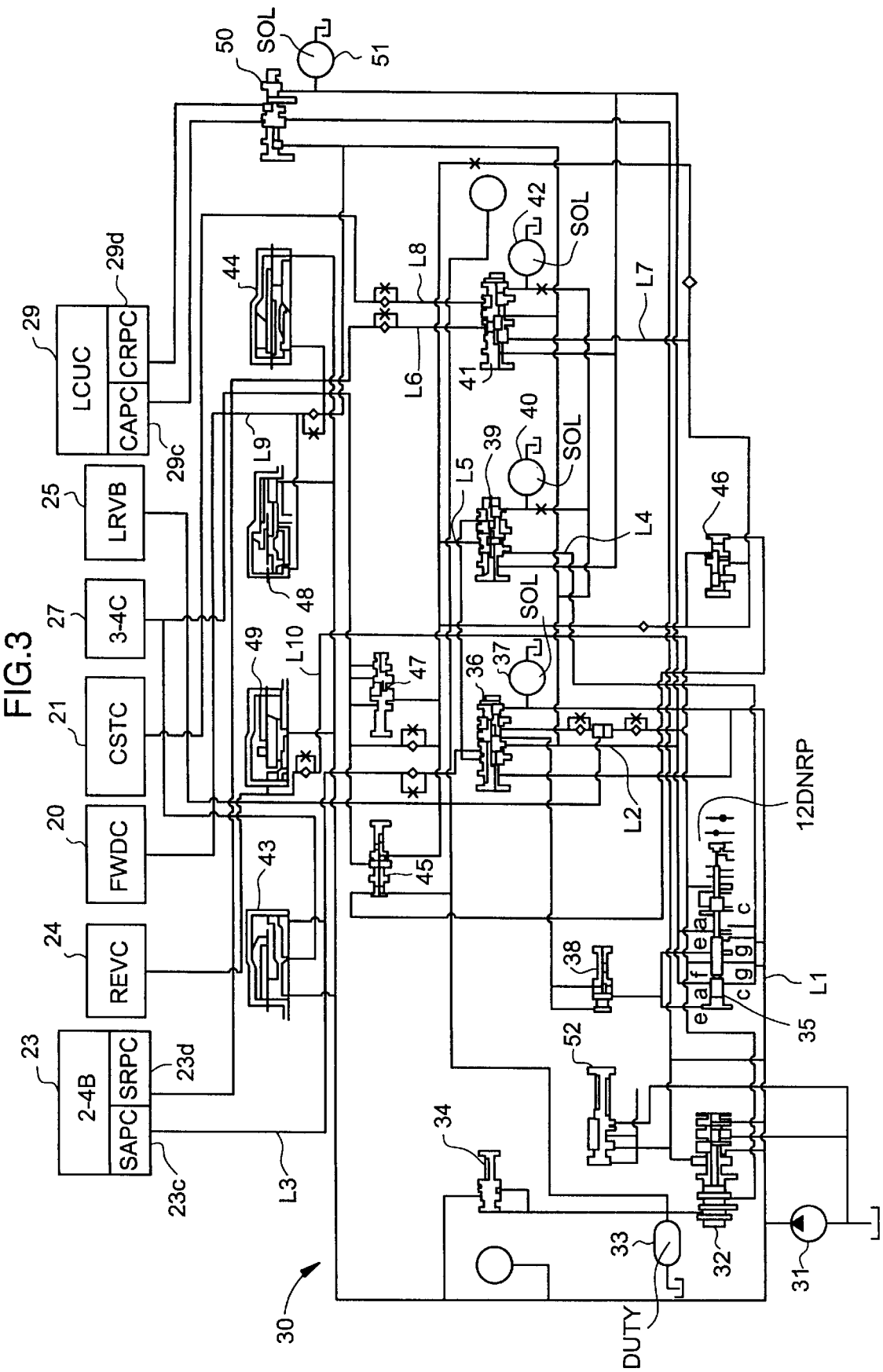
FIG. 3 is a hydraulic control circuit cooperating with the automatic transmission of FIG. 2.

FIG. 3 shows the hydraulic control circuit 10C. As shown, the oil pump 31 connected to the hydraulic control circuit 10C is driven by the output shaft 1 to discharge operating oil into a hydraulic pressure line L1. The operating oil is regulated as a line pressure by means of a regulator valve 32 and duty solenoid valve 33. Specifically, the discharged pressure from the oil pump 31 is reduced by a solenoid reducing valve 34 to a specific level and further controlled by operation of the duty solenoid valve 33. As is well known, the duty solenoid valve 33 is periodically opened and closed at a controlled duty rate so as to regulate the drain volume of operating oil which in turn controls the level of pressure. The regulated pressure is then applied to the pressure regulator valve 32 as pilot pressure in order to regulate the line pressure.

In other words, a line pressure varying mechanism is provided by these valves 32, 33 and 34. One of these valve, i.e. the duty solenoid valve 33 is controlled by means of a control unit 70, which is mainly comprised of a microcomputer and will described in detail later, with the result that the line pressure is controlled.

The adjusted line pressure through the regulator valve 32 is supplied to a port g of a manual shift valve 35. This manual shift valve 35 is placed at any position within possible shift positions of a park (P) range, a neutral (N) range, a drive (D) range, a second speed (2) range and a first speed (1) range through manual selection of the shift lever and transfers the line pressure to ports assigned to the respective ranges in response to selection of the respective ranges from the port "g". For example, the manual shift valve 35 transfers the line pressure from the port "g" to ports "a" and "e" if set at the first speed (1) range; to ports "a" and "c" if set at the second speed (2) range or at the drive (D) range; and to a port "f" if set at the reverse (R) range. The port "a" of manual shift valve 35 is connected to a 1–2 shift valve 36 through a pressure line L2. Pilot pressure at the 1–2 shift valve 36 is controlled by means of a 1–2 solenoid valve 37.

More specifically, when the transmission 2 is shifted into the first gear, the 1–2 solenoid valve 37 is deactivated or assumes OFF, causing the 1–2 shift valve 36 to shift its spool to a left end position as viewed in FIG. 3 so as thereby to bring its drain port into communication with a pressure line L3 leading to a brake apply pressure chamber (BAPC) 23*c* of the 2–4 brake 23. In this instance, the 2–4 brake 23 is of a type having a brake apply pressure chamber (BAPC) 23*c* and a brake release pressure chamber (BRPC) 23*d*. This type of 2–4 brake is locked only when operating pressure is applied into the brake apply pressure chamber (BAPC) 23*c* but released or drained from the brake release pressure chamber (BRPC) 23*d* and is unlocked in any case excepting the above event. When the transmission 10 is running in the second through fourth gears, the 1–2 solenoid valve 37 is activated or assumes ON, causing the 1–2 shift valve 36 to shift its spool to a right end position as viewed in FIG. 3 so as thereby to bring the port "a" of the manual shift valve 35 into communication with the brake apply pressure chamber (BAPC) 23*c* of the 2–4 brake 23 for application of the line pressure to the brake apply pressure chamber (BAPC) 23*c* of the 2–4 brake 23. Further, when the transmission 10 is running in the first gear in the first speed (1) range, the 1–2 shift valve 36 supplies the operating pressure to a low reverse brake 25 from the port "e" of the manual shift valve 35 through a low reducing valve 38.

Operating pressure from the port "a" of the manual shift valve 35 is also supplied, as pilot pressure, to a 2–3 shift valve 39. This 2–3 shift valve 39 is connected to port "c" of the manual valve 35 through a pressure line L4 so as to receive the pilot pressure controlled by a 2–3 solenoid valve 40. As a result, when the transmission 10 is in the first gear or in the second gear, the 2–3 solenoid valve 40 is activated or assumes ON, causing the 2–3 shift valve 39 to shift its spool to the right end position so as thereby to release or unlock the 3–4 clutch 27 as a result of bringing the 3–4 clutch 27 into communication with its drain port through a pressure line L5. In the third gear and fourth gear, the 2–3 solenoid valve 40 is deactivated or assumes OFF, causing the 2–3 shift valve 38 to shift its spool to the left end position so as thereby to bring the manual shift valve 35 at the port "c" into communication with the 3–4 clutch 27 through a pressure line L5 and supply the operating pressure to the 3–4 clutch 27 for locking.

A 3–4 shift valve 41 is connected to the pressure line L5. Pilot pressure for the 3–4 shift valve is controlled by means of a 3–4 solenoid valve 42. Specifically, when the transmission 10 is in any one of the first, second and fourth gears in the drive (D) range, or in the first gear in the second speed (2) range, the 3–4 solenoid valve 42 assumes ON, causing the 3–4 shift valve 41 to shift its spool to the right end position so as thereby to bring its drain port into communication with a pressure line L6 leading to a brake release pressure chamber (BRPC) 23*d* of the 2–4 brake 23. Further, when the transmission 10 is in the third gear in the drive (D) range, in any one of the second and third gears in the second speed (2) range, or in any one of the first and second gears in the first speed (1) range, the 3–4 solenoid valve 42 assumes OFF, causing the 2–3 shift valve 39 to shift its spool to the left end position so as thereby to bring the line pressure L6 into communication with the pressure line L5 leading to the 2–3 shift valve 39 with the result of supplying operating pressure to and discharging operating pressure from the brake release pressure chamber (BRPC) 23*d* of the 2–3 shift valve 23 according to spool positions of the 2–3 shift valve 39.

The 3–4 shift valve 41 operates to change over between supply and release of operating pressure between pressure lines L7 and L8 leading to the port "a" of the manual shift valve 35 and the coast clutch 21, respectively, so as to lock and unlock the coast clutch 21. With the hydraulic control circuit 10C, the operation of these shift valves 36, 39 and 41 are controlled by the solenoid valves 37, 40 and 42 to selectively lock and unlock the 2–4 shift brake 23 and 3–4 clutch 27 as the friction coupling elements as shown in FIG. 4.

The manual shift valve 35 at the port "a" is directly connected is directly connected to a forward clutch 20 by way of a pressure line L9 with an N-D accumulator 48 installed therein and supplies the line pressure to forward clutch 20 as locking pressure in the drive (D), second speed (2) and first speed (1) ranges. Similarly, the manual shift valve 35 at the port "f" is directly connected to the reverse clutch 24 by way of a pressure line L10 with an N-R accumulator 49 installed therein and supplies the line pressure to the reverse clutch 24 as locking pressure in the reverse (R) range.

Line pressure can be supplied to a clutch apply pressure chamber (CAPC) 29*c* and a clutch release pressure chamber (CRPC) 29*d* of the lockup clutch 29 by means of a lockup control valve 50 whose pilot pressure is controlled through operation of an electrically operated lockup valve 51, such as a solenoid valve. Operating pressure is selectively applied to or released from the clutch apply and clutch release pressure chambers (CAPC and CRPC) 29*c* and 29*d* of the lockup clutch 29 according to spool positions of the lockup control valve 50. In other words, locking and unlocking the lockup clutch 29 is controlled through operation of the lockup control valve 50.

The hydraulic control circuit 10C further incorporates various control elements, such as a 1–2 accumulator 43, a 2–3 accumulator 44, a 2–3 timing valve 45, a 3–2 timing valve 46 and a bypass-valve 47, in the pressure lines between the shifting valves 36, 39 and 41, and the 2–4 shift brake 23 and 3–4 clutch 27 with the purpose of reducing shift shocks. A converter relief valve 52 is installed in the hydraulic control circuit 10C.

Figure 1:
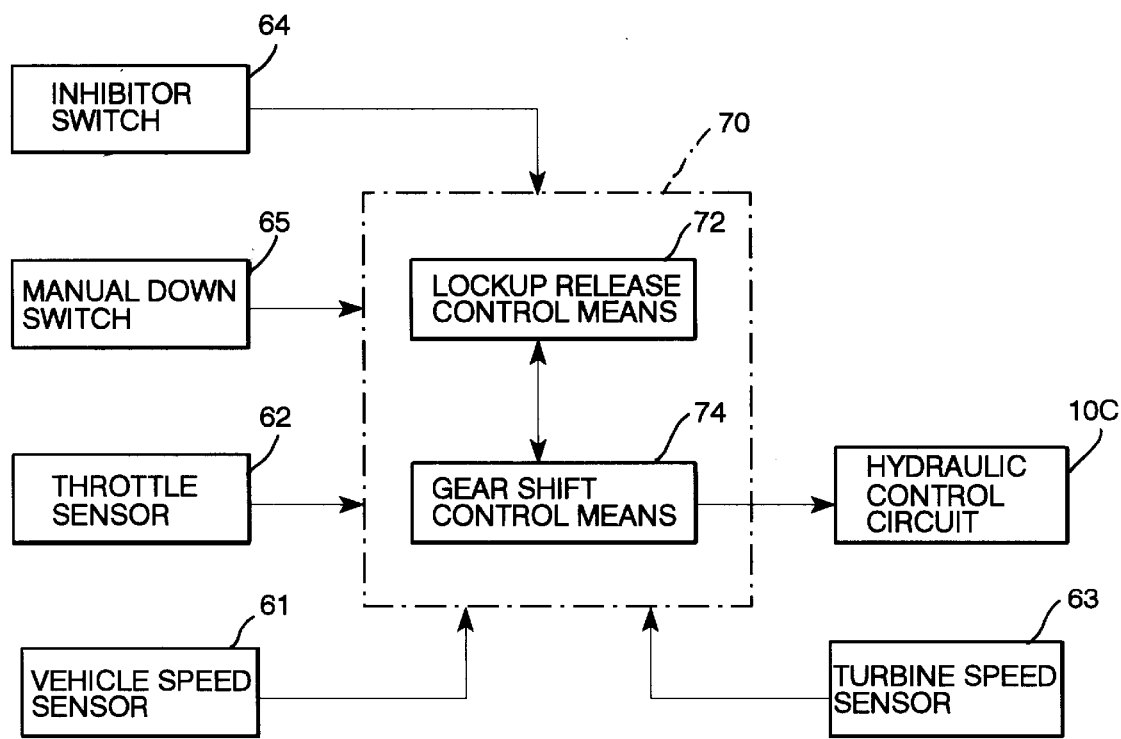
FIG. 1 is a block diagram illustrating the overall construction of an automatic transmission control system in accordance with an embodiment of the invention.

As shown in FIG. 1, in order for the automatic transmission to be properly controlled according to driving conditions, various sensors and switches are associated with the transmission control unit 70, such as a throttle sensor 62, a turbine speed sensor 63, an inhibitor switch 64 and a manual downshift switch 65 which are well known in operation to a person skilled in the art. Specifically, the throttle sensor 62 detects throttle opening (TVO) of a throttle valve (not shown) associated with the engine. The turbine speed sensor 63 detects the rotational speed of turbine shaft 13 (Ntb) per unit time. The inhibitor switch 64 detects selected manual shift lever positions (P, R, N, D, 2 and 1). The manual downshift switch 65 outputs a downshift command signal as a result of the selected shift lever position. For instance, the manual downshift switch 65 takes, for instance, the form of a hold switch which, when operated, outputs a command signal for compelling a transmission o stay only in a gear or gears allocated to each of, as a rule, forward ranges, i.e. the drive (D), first speed (1) and second speed (2) ranges or the form of an overdrive-off switch for forcibly preventing a transmission from shifting into the highest gear in the drive (D) range.

Output signals from these sensors 61–63 and switches 64 and 65 are transmitted as control signals to the transmission control unit 70 which in turn offers a downshift control function realized through a downshift determination means 72 and downshift control means 74. The down shift determination means 72 outputs a downshift command signal to the downshift control means 74 in specific events where an abrupt change in throttle opening (TVO) occurs crossing a scheduled downshift line which is mapped with respect to throttle opening and vehicle speed, where a fall in vehicle speed occurs crossing the scheduled downshift line, where the inhibitor switch 64 detects selection to lower speed ranges, or where the manual downshift switch 65 outputs a downshift signal demanding a gear slower than the existing gear. Together, the shift determination means 72 concurrently outputs a signal denoting the origination of the downshift command from one of the four possible states listed above to the downshift control means 74.

When the downshift control means 74 receives a downshift command signal from the downshift determination means 72, a control signal is output to the hydraulic control circuit 10C for causing practical execution of a downshift. Concurrently, while a control signal is output to the lockup solenoid valve 51, effecting the activation of the lockup control valve 50 and the subsequent release of the lockup clutch 29. That is, the direct coupling of the torque converter 10B is released. If the downshift has resulted from any one of the previously mentioned last three events, the lockup clutch 29 releases at a lower speed than if the lockup command signal is originated from the first event. This release speed is lowered by changing the duty rate (Dy) at which the lockup solenoid valve 51 operates.

Figure 5:
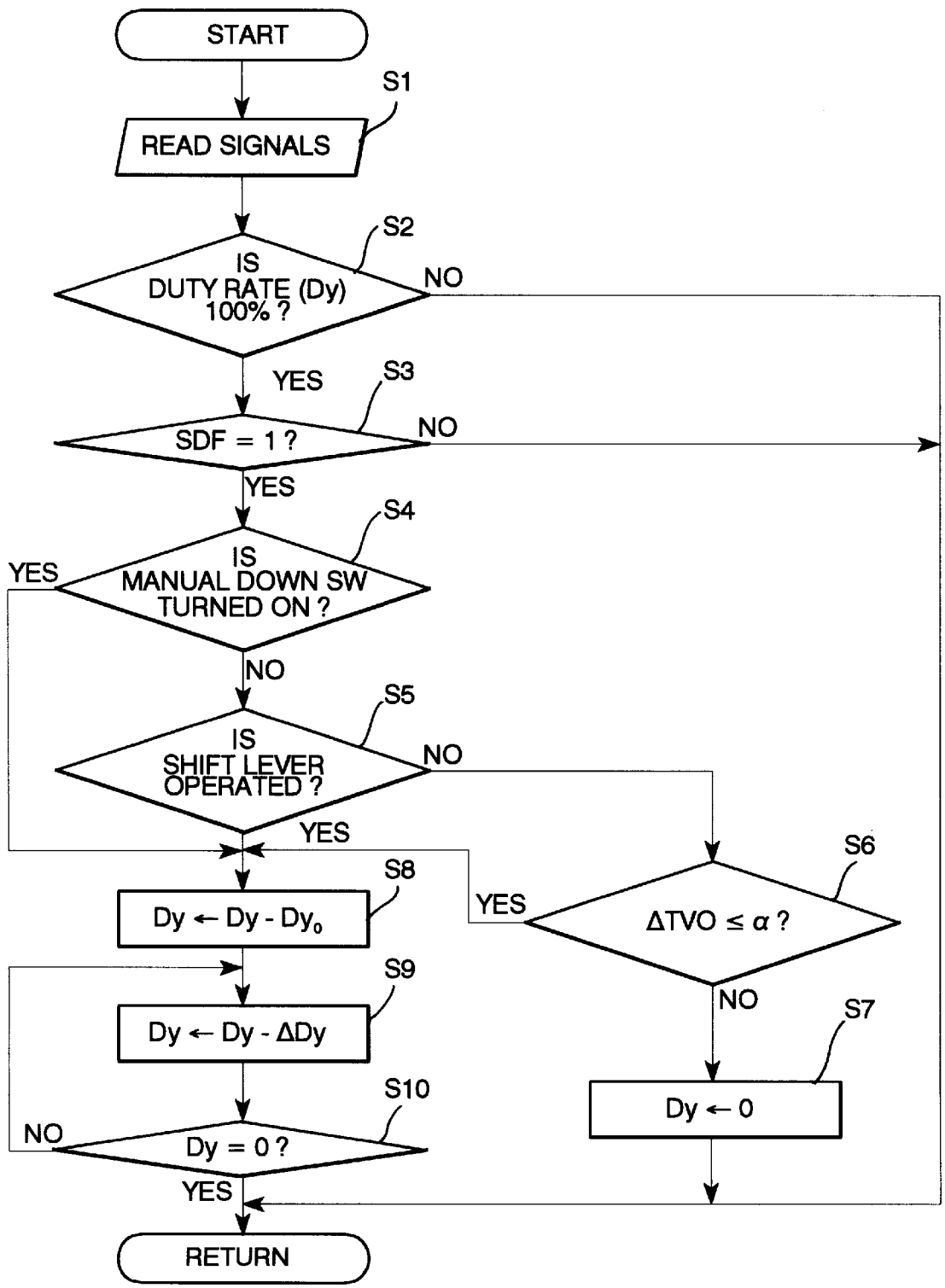
FIG. 5 is a flow chart illustrating a sequence routine of a lockup release control for the automatic transmission control system of FIG. 1.

FIG. 5 shows a flow chart illustrating a shift control logic in accordance with the subject invention. The flow chart logic commences and control passes directly to a function block S1 where the control unit 70 reads control signals from the sensors and switches 61–65. When a duty rate (Dy) of the lockup solenoid valve 51 is determined on the basis of the control signals to be 100% at step S2, and when the downshift flag SDF is determined to have been up or set to 1 at step S3, in other words, when the required downshift condition is currently met, while a downshift is executed, the lockup clutch 29 is released or unlocked.

Figure 6:
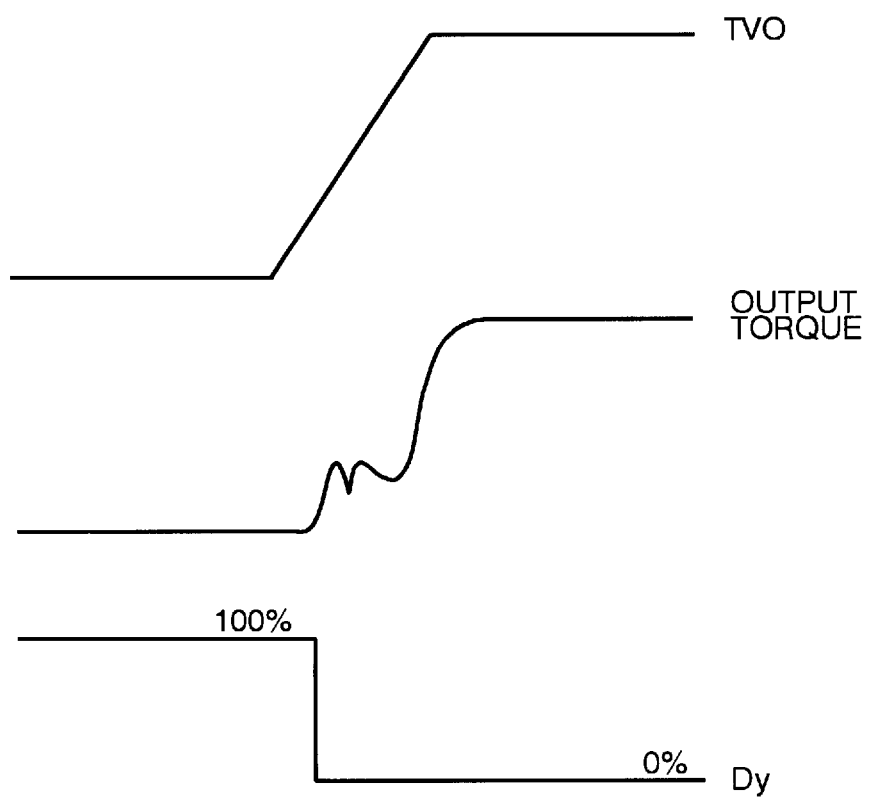
FIG. 6 is a time chart showing the lockup release control when a downshift takes place due to an abrupt increase in throttle opening.

If the downshift occurs due to an abrupt increase throttle opening (TVO), that is, in the event where the manual downshift switch 65 has not been turned on at step S4, no operation of the shift lever has been made at step S5, and a change in throttle opening per unit time (ΔTVO) is greater than a specified reference value α at step S6, the duty rate (Dy) is instantaneously changed to 0% at step S7, as shown in FIG. 6. This instantaneous change in duty rate forces the lockup control valve 50 to shift its spool quickly, so that the lockup clutch 29 is immediately unlocked and, as a result, prevents the transmission from experiencing shift shock due to a delay of unlocking the lockup clutch 29. In an event where the downshift is induced due to an abrupt increase in throttle opening (TVO) as shown in FIG. 6, that is, when it originates from a rapid release of the lockup clutch, an energy loss occurs at the torque converter 2. However, since such a downshift is accompanied by an increase in engine output, the transmission 10 dose not cause a rapid decrease in output torque which results in shift shock.

Conversely, in the event where the downshift is not due to an abrupt increase in throttle opening (TVO), that is, when the manual downshift switch 65 turns on at step S4, or when no operation of the shift lever is made at step S5, or when, while the manual down switch 65 and shift lever have not operated, the downshift occurs with a change in throttle opening ΔTVO per unit time less than a specified reference value α (which results from a decrease in vehicle speed) at step S6, the duty rate (Dy) at which the lockup solenoid valve 51 operates is, not instantaneously, but gradually changed from 100% until a duty rate of 0% is attained through steps S8 and S9. Specifically, the duty rate (Dy) is gradually changed by specified reduction degrees ΔDy following a jump to a specified initial reduction duty rate ($Dy_0$).

Figure 7:
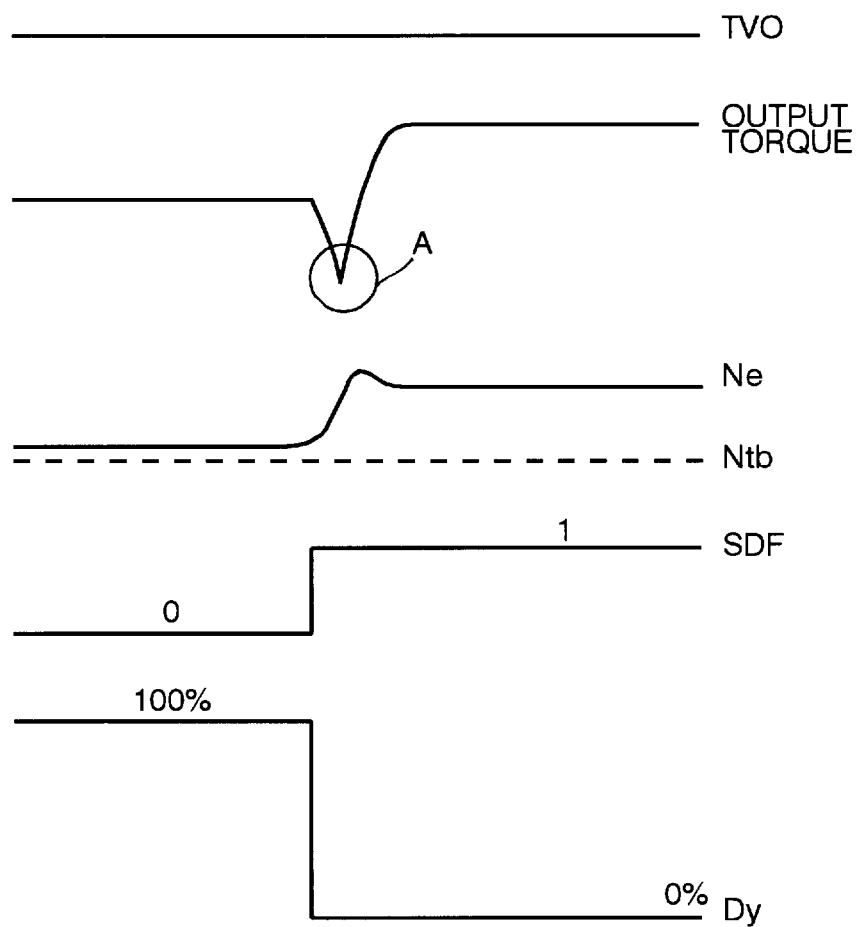
FIG. 7 is a time chart showing conventional lockup release control when a downshift takes place due not to an abrupt increase in throttle opening.

FIG. 7 shows a time chart for the throttle opening (TVO), output torque, engine speed (Ne), and turbine RPM (Ntb) in the conventional transmission control, differing from the invention as explained herein, in which the duty rate is instantaneously reduced from 100% to 0% despite a downshift not resulting from an abrupt increase in throttle opening (TVO). As FIG. 7 demonstrates, in the event, while the throttle. Opening TVO is approximately constant with no increase in engine output, the duty rate suddenly jumps to 0%, there is a sudden energy loss incurred in torque converter 10A which results in a momentary but significant drop in output torque as shown at "A". This phenomenon results in a large shock being felt by the driver.

Contradistinctly, as shown in FIG. 8, reducing the duty rate (Dy) gradually to 0% prevents an occurrence of a sudden falloff in output torque at the output shaft which always makes the driver feel a shift shock.

Figure 9A:
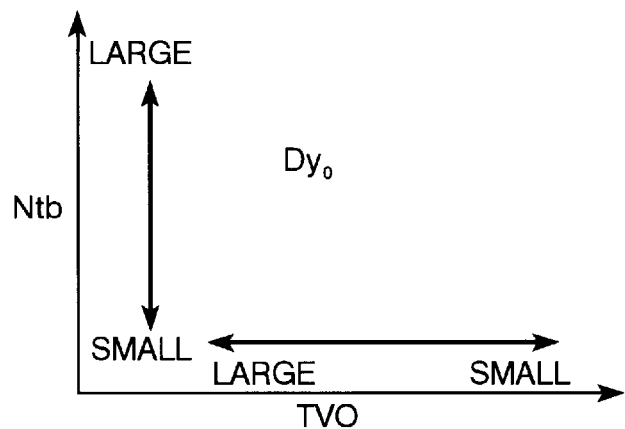
FIG. 9(A) is a graphical illustration showing the initial reduction duty rate mapped in relation to throttle opening and turbine speed.
Figure 9B:
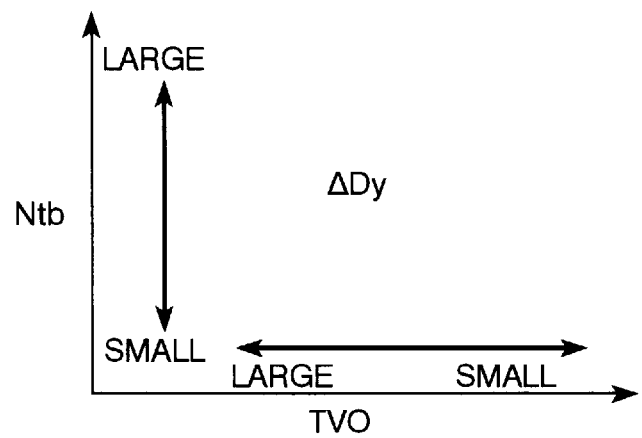
FIG. 9(B) is a graphical illustration showing the duty rate reduction degree mapped in relation to throttle opening and turbine speed.

Even in the transmission control in which the duty rate (Dy) is gradually reduced, if the initial reduction duty rate ($Dy_0$) is large and there is an excess of engine torque, there remains the possibility that the lockup clutch 29 would release too quickly due to a lack of lockup maintenance pressure. Conversely, if the initial reduction duty rate ($Dy_0$) is small and there is insufficient engine torque, the lockup release action of lockup clutch 29 could be delayed. To avoid these problems, the initial reduction duty rate ($Dy_0$) is maintained as small as possible in regard to engine torque. As a practical way of achieving this end, as shown in FIG. 9(A), the initial reduction duty rate ($Dy_0$) is mapped in relation to throttle opening (TVO) and turbine speed (Ntb) such that the initial reduction duty rate ($Dy_0$) be increased as throttle opening (TVO) decreases and as turbine RPM (Ntb) increases. Regardless of the setting of initial reduction duty rate ($Dy_0$), in cases where the time necessary for the lockup clutch 29 to unlock must be unchanged, the duty rate reduction degree (ΔDy), as shown in FIG. 9(B), can be mapped in relation to throttle opening (TVO) and turbine speed (Ntb) such that, differing from the mao of initial reduction duty rate ($Dy_0$), the duty rate reduction degree (ΔDy) should be set at a larger degree as throttle opening (TVO) increases and as turbine speed (Ntb) decreases.

During a condition of low engine torque, the duty rate mapping reduces the duty rate (Dy) in a progressive manner as shown by a solid line in FIG. 8. On the other hand, during a condition of high engine torque, the duty rate mapping will reduce the duty rate (Dy) as shown by a broken line In FIG. 8. A duty cycle rate is always ensured to be higher during unlocking for the condition of high engine torque than for the condition of low engine torque. In other words, a higher lockup maintenance pressure is provided for the condition of high engine torque than for the condition of low engine torque.

The transmission control system of this invention can also be effected by executing the downshift determination only at step S6 without going through steps S4 and S5 in FIG. 4. If the downshift determination is only executed as a result of the throttle opening (TVO), the control, however, encounters delicate and difficult determination of downshift. It is assured by the information regarding manual downshift operations entered through the downshift switch 65 and/or the shift position sensor to aid in the determination of a downshift being caused due not to an increase in engine load.

In regard to the determination concerning the throttle opening (TVO) with respect to the reference value $\alpha$ made at step S6 of FIG. 5, parameters corresponding to engine load, such as engine torque, may be monitored in relation to a specified reference value $\beta$.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling an automatic transmission equipped with lockup means for locking up and unlocking a torque converter installed to said automatic transmission by directly coupling and uncoupling input and output shafts of said torque converter, respectively, said automatic transmission automatically causing a downshift in response at least to an increase in engine load, said control system comprising:

lockup pressure control means for causing said lockup means to unlock said torque converter when a downshift is induced in said automatic transmission; and lockup release control means for detecting an increase in engine load, and for causing said lockup means to unlock said torque converter at a rate smaller in events where detecting an increase in engine load lower than a predetermined value while a downshift is caused than in events where detecting an increase in engine load equal to or greater than said predetermined value while a downshift is caused.

2. An automatic transmission control system as defined in claim 1, wherein said lockup release controlling means monitors a change in engine throttle opening at a downshift and determines that said downshift is from an increase in engine load when said change occurs at a rate greater than a specified rate.

3. An automatic transmission control system as defined in claim 1, wherein said lockup release controlling means includes manual downshift detecting means for detecting operation of manually operated downshift means for intentionally causing a downshift through a driver's operation, said lockup release control means determining that said downshift is from an event other than an increase in engine load when said manual downshift detecting means detects operation of said manually operated downshift means.

4. An automatic transmission control system as defined in claim 2, wherein said lockup release controlling means includes manual downshift detecting means for detecting operation of manually operated downshift means for intentionally causing a downshift through a driver's operation, said lockup release control means determining that said downshift is from an event other than an increase in engine load when said manual downshift detecting means detects operation of said manually operated downshift means.

5. An automatic transmission control system as defined in claim 4, wherein said manual downshift detecting means comprises a position sensor for detecting operated positions of a manual shift lever.

6. An automatic transmission control system as defined in claim 4, wherein said manual downshift detecting means comprises a switch which is manually operated to force said automatic transmission to cause a downshift.

7. An automatic transmission control system as defined in claim 1, wherein said lockup release control means controls said lockup release means such that said lockup means maintains a higher lockup maintenance pressure during lockup releasing as engine torque is greater when said lockup release control means determines that said downshift is from an event other than an increase in engine load.

8. A control system for controlling an automatic transmission equipped with a lockup clutch for locking up and unlocking a torque converter installed to said automatic transmission by directly coupling and uncoupling input and output shafts of said torque converter, respectively, said automatic transmission automatically causing a downshift in response at least to an increase in engine load, said control system comprising:

lockup pressure control means for controlling a lockup pressure with which said lockup clutch locks said torque converter;

monitoring means for monitoring engine operating conditions and providing a downshift command signal when predetermined engine operating conditions including an engine load for downshifts are detected; and lockup release control means for detecting said downshift command signal and for causing, in response to an occurrence of said downshift command signal while said lockup clutch locks said torque converter, said lockup pressure control means decreasing said lockup pressure at a first specified rate in events where an increase in engine load greater than said predetermined value is detected while detecting said downshift command and at a second specified rate smaller than said first specified rate in events where an increase in engine load smaller than said predetermined value is detected while detecting said downshift command.

9. An automatic transmission control system as defined in claim 8, wherein said first specified rate is set such that said lockup pressure control means decreases said lockup pressure rapidly so as to cause said lockup clutch to instantaneously unlock said torque converter upon an occurrence of said downshift command signal and said second specified rate is set such that said lockup pressure control means decreases said lockup pressure gradually so that said lockup clutch leisurely unlocks said torque converter after an occurrence of said downshift command signal.

10. An automatic transmission control system as defined in claim 9, wherein said lockup pressure control means comprises a lockup control valve for controlling supply of said lockup pressure to a lockup pressure chamber and an unlock pressure chamber of said lockup clutch and a duty solenoid valve for controlling an operating pressure of said lockup control valve.

11. An automatic transmission control system as defined in claim 10, wherein said lockup release control means changes a duty rate at which said duty solenoid valve operates according to said first and second specified rates.

12. An automatic transmission control system as defined in claim 11, wherein said lockup release control means changes said duty rate by predetermined regular degrees for said second specified rate.

13. An automatic transmission control system as defined in claim 11, wherein said lockup release control means changes said duty rate for said second specified rate to a specified initial reduction duty rate first and subsequently changes it by predetermined regular reduction rate.

14. An automatic transmission control system as defined in claim 13, wherein at least one of said initial reduction duty rate and said regular reduction rate is varied according to engine output torque.

15. An automatic transmission control system as defined in claim 14, wherein said initial reduction duty rate is increased as throttle opening decreases and as turbine speed increases.

16. An automatic transmission control system as defined in claim 14, wherein said regular reduction rate is set to be larger as throttle opening increases and as turbine speed decreases.

17. An automatic transmission control system as defined in claim 8, wherein said lockup release controlling means monitors a change in engine throttle opening at a downshift and determines that said downshift is from an increase in engine load when said change occurs at a rate greater than a specified rate.

18. An automatic transmission control system as defined in claim 8, wherein said lockup release controlling means includes manual downshift detecting means for detecting operation of manually operated downshift means for intentionally causing a downshift through a driver's operation, said lockup release control means determining that said downshift is from an event other than an increase in engine load when said manual downshift detecting means detects operation of said manually operated downshift means.

19. An automatic transmission control system as defined in claim 17, wherein said lockup release controlling means includes manual downshift detecting means for detecting operation of manually operated downshift means for intentionally causing a downshift through a driver's operation, said lockup release control means determining that said downshift is from an event other than an increase in engine load when said manual downshift detecting means detects operation of said manually operated downshift means.

20. An automatic transmission control system as defined in claim 18, wherein said lockup release controlling means includes manual downshift detecting means for detecting operation of manually operated downshift means for intentionally causing a downshift through a driver's operation, said lockup release control means determining that said downshift is from an event other than an increase in engine load when said manual downshift detecting means detects operation of said manually operated downshift means.

21. An automatic transmission control system as defined in claim 20, wherein said manual downshift detecting means comprises a position sensor for detecting operated positions of a manual shift lever.

22. An automatic transmission control system as defined in claim 1, wherein unlocking of said lock-up clutch progresses slower when a down-shift is caused due to a change in driving condition other than an increase in engine load greater than a predetermined value than when a down-shift is caused due to a change in engine load greater than said predetermined value.

23. An automatic transmission control system as defined in claim 1, wherein said lock-up clutch is unlocked over a longer time period when a down-shift is caused due to a change in driving condition other than an increase in engine load greater than a predetermined value than when a down-shift is caused due to a change in engine load greater than said predetermined value.

24. A control system for controlling engagement and disengagement of a hydraulically controlled lock-up clutch to lock and unlock a torque converter of an automatic transmission which causes automatically a down-shift in response at least to an increase in engine load, said control system comprising:

a solenoid valve for controlling hydraulic pressure supplied to said lock-up clutch to lock said lock-up clutch;

a shift sensor for detecting a down-shift of said automatic transmission;

a load sensor for detecting engine load;

a control unit for actuating said solenoid valve to control said hydraulic pressure so as to disengage said lock-up clutch when said shift sensor detects a down-shift of said automatic transmission, said control unit further controlling said solenoid valve to vary said hydraulic pressure in such a way that disengagement of said lock-up clutch progresses slower when said down-shift is caused due to a change in driving condition other than an increase in engine load detected by said load sensor greater than a predetermined value than when said down-shift is caused due to a change in engine load detected by said load sensor greater than said predetermined value.

* * * * *